United States Patent [19]
Polcyn

[11] Patent Number: 5,699,412
[45] Date of Patent: Dec. 16, 1997

[54] SYSTEMS AND METHODS FOR STATISTICAL DISTRIBUTION OF MESSAGES IN A MESSAGE RECORDING SYSTEM

[75] Inventor: Michael J. Polcyn, Allen, Tex.

[73] Assignee: InterVoice Limited Partnership, Reno, Nev.

[21] Appl. No.: 529,616

[22] Filed: Sep. 18, 1995

[51] Int. Cl.$^6$ .................................................. H04M 1/64
[52] U.S. Cl. .......................... 379/89; 379/112; 379/113; 379/34
[58] Field of Search .......................... 379/67, 88, 89, 379/111, 112, 113, 34

[56] References Cited

U.S. PATENT DOCUMENTS

| | | | |
|---|---|---|---|
| 5,006,983 | 4/1991 | Wayne et al. | 364/401 |
| 5,029,199 | 7/1991 | Jones et al. | 379/89 |
| 5,185,780 | 2/1993 | Leggett | 379/113 |

*Primary Examiner*—Fan Tsang
*Attorney, Agent, or Firm*—Fulbright & Jaworski L.L.P.

[57] ABSTRACT

There is disclosed a distributed architecture messaging recording system that employs a statistical engine to monitor system usage and to distribute individual subscribers across the various nodes of the systems so as to minimize the likelihood of system blockages. The statistical engine monitors access to the system by both system subscribers and by callers leaving messages for the subscribers. The statistical engine monitors time of day of use and duration of use, as well as functions used, such as broadcast functions to then rearrange the subscribers on a dynamic basis.

22 Claims, 3 Drawing Sheets

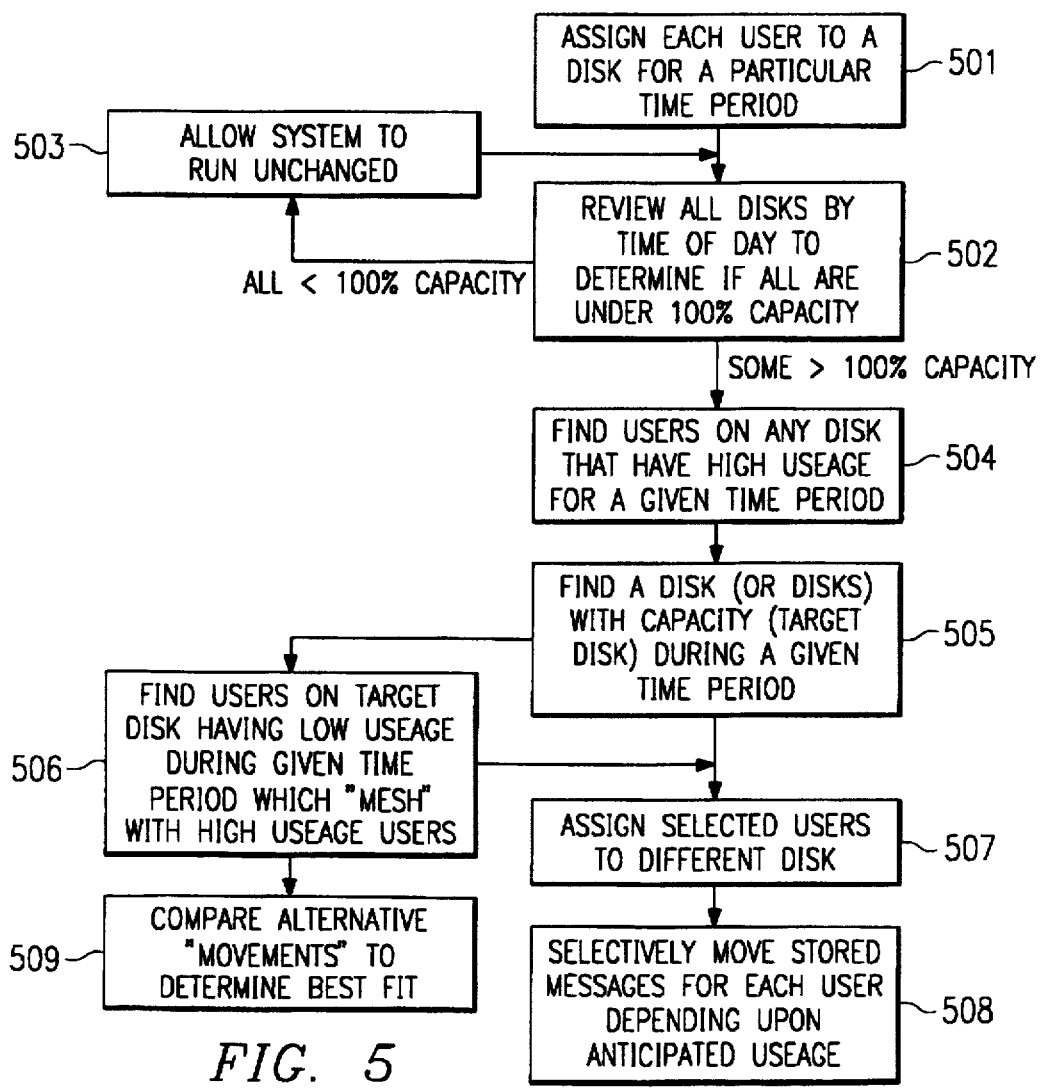

SYSTEMS AND METHODS FOR STATISTICAL DISTRIBUTION OF MESSAGES IN A MESSAGE RECORDING SYSTEM

TECHNICAL FIELD OF THE INVENTION

The present invention relates to a communication system used for handling message storage and, in particular, to a distributed architecture messaging system that employs a statistical engine to monitor system usage and to minimize system blockages by distributing heavy system users evenly throughout the system.

BACKGROUND OF THE INVENTION

Recent years have seen a great increase in the number and diversity of message storage systems as more and more people use such systems in business and personal applications. Many such systems, such as E-mail, voice mail, fax, etc., are designed as part of a central office switch in the switched public network, while others are designed to operate in conjunction with a private branch exchange (PBX). In either case, message storage systems typically include one or more voice or data processing units coupled to the switched public network through a finite number of telephone lines. These data processing units are dedicated to serving a group of subscribers, usually employees of the business which owns the PBX. Individual subscribers are usually assigned to a specific processing unit and messages for each subscriber are typically stored in a local storage device connected to the dedicated data processing unit. Normally, groups of data processing units share access to a common storage device.

During periods of heavy usage, the numerous data processing units of a PBX may consume all of the available bandwidth of the common storage device. In such a case, new incoming data for a particular subscriber will not be allowed to be stored because the dedicated processing unit for that subscriber is not able to access the common storage device. Similarly, if a subscriber attempts to retrieve data messages from the common storage device during a period of high usage, the subscriber will be unable to obtain the messages because there is no available bandwidth with which to access the storage device.

Some prior art systems have attempted to avoid the bandwidth limitations of common storage devices by employing a front-end switch which directs incoming calls for a specific subscriber to the dedicated processing unit assigned to that subscriber or, if the dedicated processing unit is busy, to an alternate processing unit. The alternate processing unit will handle the call and store the data messages on an alternate storage device associated with the alternate processing unit.

The data message may then be transferred across an internal network or data bus from the alternate storage device to the dedicated storage device coupled to the dedicated processing unit for that particular subscriber. One such system is disclosed in U.S. Pat. No. 5,029,199, entitled "Distributed Control and Storage for a Large Capacity Messaging System" to Jones et al., which patent is hereby incorporated by reference in the present disclosure.

This solution to the bandwidth limitations of memory storage devices during periods of high traffic in a PBX is nonetheless inadequate. If a subscriber calls in to retrieve mail messages and the messages have been distributed to alternate storage devices, the message system must gather the numerous messages from the different storage devices and relay them across the internal network to the processing unit handling the subscriber's message retrieval. This may introduce latencies from several seconds up to a minute or more, depending upon the volume of traffic on the network.

Furthermore, while the prior art messaging systems enable a caller to leave a mail message for a subscriber even if that subscriber's dedicated processing unit is busy, the prior art systems fail to anticipate these situations or attempt to avoid them.

There is therefore a need in the art for a messaging system that actively avoids system blockages to individual subscriber's dedicated processors thereby minimizing the number of times the system must switch to alternate processors and alternate storage devices to handle the subscriber's messages.

SUMMARY OF THE INVENTION

The problems inherent in the prior art have been solved by the present invention which provides a statistical engine that monitors the access and usage patterns of incoming calls to a message storage system and matches system resources to user bandwidth requirements in order to avoid system blockages.

The present invention also provides a statistical engine that monitors the messaging traffic in a storage system, determines which subscribers are high volume users of the system and evenly distributes the high volume users among separate processing units and storage devices in order to minimize system access blockages.

The present invention further provides a statistical engine that monitors message traffic in a storage and retrieval system, determines the times of day in which the level of access to a particular processing unit and/or storage device is likely to be great enough to cause an access blockage to that processing unit or storage device and, accordingly, reassigns some of the subscribers dedicated to that processing unit to other processing units.

The present invention also provides a statistical engine for monitoring the functions used by subscribers the functions used by subscribers in a mail retrieval system and for determining which subscribers use high bandwidth functions, such as broadcast.

There is a further need in the art for a storage processing system which statistically monitors the frequency and duration of mail messages left by callers for each subscriber and the frequency and duration of mail retrievals by each subscriber to determine the level of usage of each subscriber in the mail system.

The foregoing has outlined rather broadly the features and technical advantages of the present invention in order that the detailed description of the voice mail message system that follows may be better understood. Additional features and advantages of the mail message system will be described hereinafter which form the subject of the claims of the invention.

It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3–5 illustrate block diagrams of a messaging system in accordance with the present invention.

DETAILED DESCRIPTION OF THE INVENTION

Figure 1:
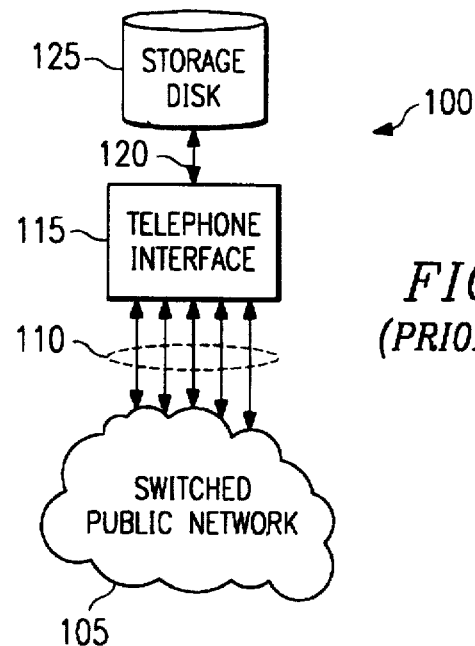
FIG. 1 illustrates a black diagram of a simple prior art message storage and retrieval system.

FIG. 1 depicts a simple voice mail system 100 in accordance with the prior art. Incoming telephone calls are received from switched public network 105 through telephone lines 110 by telephone interface 115. Telephone interface 115 typically includes one or more voice processing units which are dedicated to serve a predetermined number of telephone lines 110 and a particular group of subscribers. Each of the voice processing units within telephone interface 115 functions as a home base for its assigned subscribers and stores voice mail messages for those subscribers on storage disk 125 through bus 120.

Two sources of system blockages are obvious in FIG. 1. First, if too many calls are received for subscribers assigned to the same voice processing unit within telephone interface 115, the voice processing unit will reach its maximum limit and no further incoming calls to those subscribers or any other subscriber dedicated to that particular voice processing unit can be handled. New callers will therefore be unable to leave voice mail messages for any subscribers serviced by the busy voice processing unit.

Secondly, all of the voice processing units in telephone interface 115 compete for access to bus 120 when the voice processing units attempt to store or retrieve voice mail messages to or from storage disk 125. Therefore, the bandwidth limitation of bus 120 serves as a bottle neck to voice mail system 100 whenever too many, voice processing units attempt to store or retrieve voice messages through bus 120 simultaneously.

Figure 2:
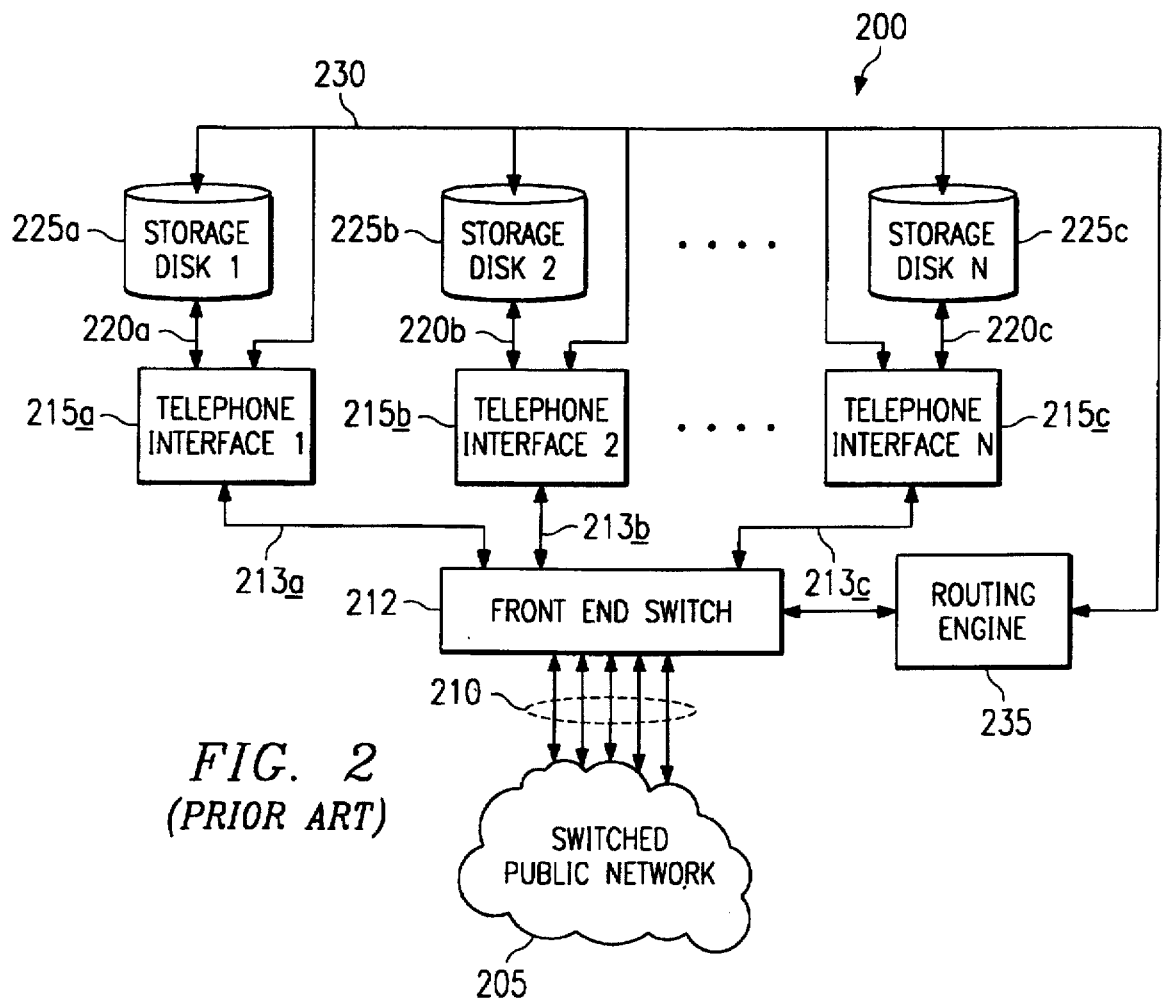
FIG. 2 illustrates a block diagram of a prior art messaging system employing a front end switch and a network to distribute messages across a distributed architecture.

FIG. 2 depicts an improved voice mail system 200 in accordance with the prior art U.S. Pat. No. 5,029,199 to Jones et al. Prior art voice mail system 200 employs a front end switch 212 to connect to telephone lines 210 from the switched public network 205. Voice mail system 200 employs routing engine 235 to direct incoming calls to telephone interfaces 215a–c and storage disks 225a–c.

Voice mail system 200 represents the typical architecture used by a large corporate user or other large entity. As incoming calls are received from switched public network 205, the calls are handled by one or more voice processing units (VPUs) within telephone interfaces 215a–c that serve as dedicated "home bases" to particular subscribers. For example, the voice processing units in telephone interface 215a (telephone interface 1) may handle the voice mail messages for subscribers 1–1000 of the entity which uses voice mail system 200. Under normal operations, all voice mail messages sent to or retrieved from storage disk 225a (storage disk 1) for subscribers 1–1000 are handled entirely by the voice processing units in telephone interface 1.

Similarly, voice processing units in telephone interface 2 and storage disk 2 are the dedicated "home base" for subscribers 1001–2000 of voice mail system 200. Also, voice processor units in telephone interface N and storage disk N are the dedicated "home base" for subscribers 2001–3000.

When an incoming call is received on telephone lines 210, routing engine 235 identifies the subscriber to whom the incoming call is directed. Routing engine 235 may identify the subscriber based on the telephone number dialed by the incoming caller or, alternatively, the incoming caller may be prompted by a voice-scripted message to enter the extension number of a subscriber on the DTMF keypad of a push button telephone. In either case, routing engine 235 determines which voice processing unit is assigned to the identified subscriber and directs front end switch 212 to switch the incoming call across communication lines 213a–c to the appropriate telephone interface 215a–c. In a preferred embodiment, routing engine 235 coordinates the routing of calls based on conventional Simplified Message Desk Interface (SMDI) information packets from switched public network 205 or PBX.

To avoid the system blockages that are inherent in voice mail system 100 depicted in FIG. 1, voice mail system 200 includes an internal bus or network 230 that typically includes both a data bus and a voice bus. When all of the voice processing units in a particular telephone interface 215a–c are busy processing calls, any new incoming calls directed to a subscriber serviced by a busy VPU is re-directed by routing engine 235 to a remote VPU in a different telephone interface 215a–c using front end switch 212.

For example, if telephone interface 1 is handling a high volume of calls such that the "home" voice processing unit for subscriber 1 is unavailable in telephone interface 1, or bus 220a to storage disk 1 is at its maximum capacity, a new incoming call to subscriber 1 will not be able to access storage disk 1 in order to leave a voice message for subscriber 1. When such a busy condition is detected, the voice processing units in telephone interface 1 send a data message to routing engine 235 across network 230, which routes control data and messages between routing engine 235 and the voice processing units and storage disks. The new incoming call for subscriber 1 is then routed to, for example, a remote voice processing unit in telephone interface 2 which handles the call and stores the voice message on storage disk 2.

Similarly, if subscriber 1 calls to retrieve voice mail messages while subscriber 1's home voice processing unit is busy or when bus 220a to storage disk 1 is at maximum capacity, routing engine 235 re-routes subscriber 1 to a remote VPU which will handle subscriber 1's message retrieval. In such a case, the remote VPU will access storage disk 1 through network 230 and retrieve the voice mail messages for subscriber 1.

Routing engine 235 maintains a master record of voice mail messages left for each subscriber to voice mail system 200 so that each subscriber can retrieve voice messages handled by the subscriber's home voice processing unit and by remote voice processing units that have received and stored voice mail messages for the subscriber. If subscriber 1 calls into subscriber 1's home VPU in telephone interface 1 to retrieve messages, messages that were previously stored in storage disk 2 and storage disk N by remote VPUs are transferred to storage disk 1 across network 230 during the voice mail retrieval by subscriber 1. Likewise, if subscriber 1 is connected to a remote VPU in telephone interface 2 to retrieve subscriber 1's messages, voice mail messages that were previously stored in storage disk 1 and remote storage disk N will be transferred to storage disk 2 across network 230.

In this manner, voice mail messages may always be left or retrieved in voice mail system 200 so long as at least one voice processing unit is available to handle an incoming call. Incoming calls to voice mail system 200 are preferably routed to the home voice processing unit assigned to each subscriber. In the event that the home VPU is busy, the incoming call may be directed to the least busy remote voice processing unit in one type of distribution scheme. In another distribution scheme, the incoming call may be re-routed to the first remote voice processing unit available on a list with a predetermined order of remote voice processing unit selections.

After a voice message is stored by either a home voice processing unit or a remote voice processing unit, the location of the voice mail message is sent to routing engine 235 so that the message may later be retrieved when the subscriber calls to retrieve voice messages. Voice processing units located in telephone interfaces 1-N and storage disk 1-N may be located in widely separated geographical areas. Therefore, the elements of voice mail system 200 may be distributed among different office facilities.

The principal drawback to voice mail system 200 is that a subscriber retrieving voice mail messages will experience latencies whenever messages have to be transferred across network 230 from one storage disk to another. It is therefore preferable that situations likely to result in access blockages to storage disks or voice processing units be avoided in the first place. This will minimize the number of times that voice mail messages are left or retrieved using remote voice processing units, thereby minimizing the number of times that a subscriber experiences latencies when retrieving voice messages.

Figure 3:
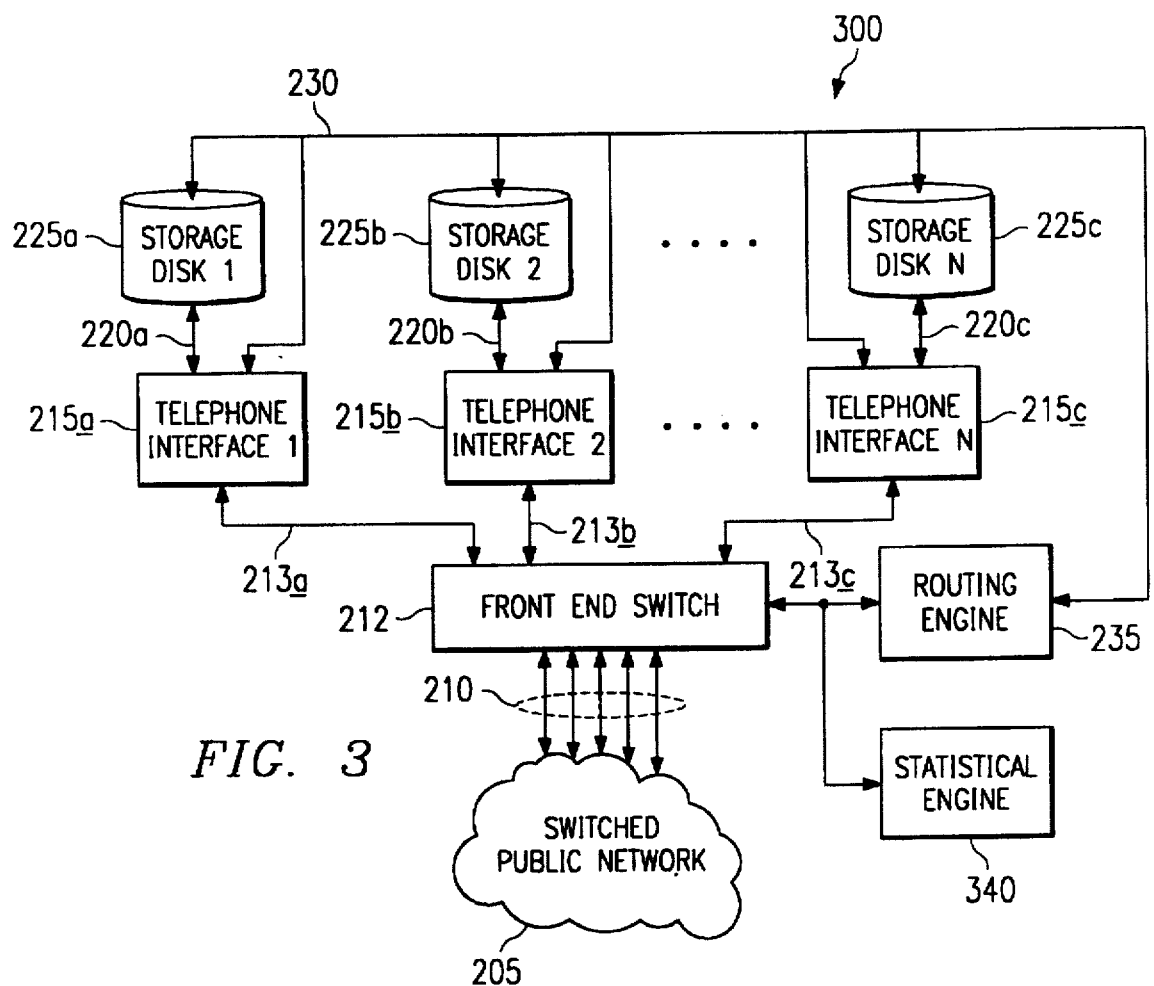

FIG. 3 depicts an improved voice mail system 300 in accordance with the present invention. Voice mail system 300 is in nearly all operational respects identical to voice mail system 200 previously described in FIG. 2. However, voice mail system 300 includes statistical engine 340 coupled to routing engine 235 which monitors both the overall usage of system 300 and the individual usage of each subscriber 1–3000 in system 300. It should also be noted that while the preferred embodiment is voice mail applications, the system can work for mixed applications, such as fax and/or E-mail data storage.

Statistical engine 340 contains circuitry and programming for detecting the initiation and termination of each access to voice mail system 300. These accesses include direct accesses, wherein a caller intentionally accesses a subscriber's voice mail, and default accesses, wherein a caller phones a subscriber and is directed to voice mail system 300 if the subscriber does not answer within a predetermined number of rings. Statistical engine 340 monitors and records access by a subscriber requesting messages as well as by incoming callers leaving messages for that subscriber. In this way, statistical engine 340 measures and records the number and duration of messages left for each subscriber and also measures and records the number and duration of each retrieval by each subscriber. Processor applications in statistical engine 340 then calculate the total access for each subscriber and the total capacity for each processor or memory unit.

Additionally, as shown in FIG. 4, statistical engine 340 records the time of day of each message left by incoming callers and each retrieval by each subscriber, thereby gathering statistical data box 401, for each user and for each memory (or processor) box 402.

Furthermore, statistical engine 340 records the functions used by subscribers, particularly broadcast functions, which leave messages for many system subscribers at once and therefore require a large amount of bandwidth from the available storage disks of system 300.

These statistics enable processor circuits and application programs in statistical engine 340 to calculate the total level of access and the average level of access to each processing unit and storage disk in system 300.

In a preferred embodiment of the present invention, and as shown in box 501, FIG. 5, the subscribers (users) are assigned to a disk (processor) and in box 502, the levels of use for all processors are compared with the maximum access capacity of the respective processing units and the maximum access capacity of the storage disks to determine the likelihood that a system blockage will occur. Also, the processor circuits in statistical engine 340 determine from the gathered statistics specific times of day during which the level of access to a particular voice processing unit or storage disk is likely to cause a blockage of that voice processing unit or storage disk. Based on the likelihood of a system blockage of a first home processing unit or storage disk, statistical engine 340 causes routing engine 235 to reassign one or more subscribers to a second home voice processing unit that has a lower likelihood of blockage. If, at a particular period of time, the statistical probability of blockage is under a present number, nothing is done, box 503, and the process is repeated.

In a preferred embodiment, statistical engine 340 also compares the total access demand for all subscribers assigned to a particular home processing unit or storage disk with the total demand on other voice processing units and storage disks in voice mail system 300, via box 504. Based on the comparative differences between the processing units and storage disks in system 300, statistical engine 340 causes routing engine 235 to reassign particular subscribers from a first home processing unit and storage disk to a second home processing unit and storage disk in order to avoid system blockages. This is shown in boxes 505, 506, 507 and 509.

Statistical engine 340 causes routing engine 235 to reassign subscribers according to two basic criteria. First, subscribers are assigned to processing units such that the total access time of subscribers to each processing unit is approximately equal across each processing unit. Statistical engine 340 therefore enables system 300 to avoid situations where a large number of heavy-use subscribers are inadvertently assigned to the same home processing unit.

Such a situation may occur, for example, where employees whose work relies heavily on telephone communication are all served by the same telephone interface 215a–c because the employees are located in the same office facility. In the prior art systems, these employees likely would have been assigned to the same home processing unit(s) in a single telephone interface in voice mail system 200.

In the present invention, statistical engine 340 redistributes the heavy-use employees to new home VPUs that may be located in remote telephone interfaces 215a–c. By reassigning subscribers to new home VPUs, statistical engine 340 minimizes the likelihood of access blockages so that mail messages are (ideally) always stored on each subscriber's home storage disk. This eliminates the latencies involved in the retrieval of mail messages from remote storage disks using network 230.

A second criteria of statistical engine 340 in reassigning subscribers to new home processing units is to determine particular times of day during which incoming calls to a particular group of subscribers assigned to the same home processing unit or storage disk is likely to cause a system blockage of the home processing unit or storage disk. This type of incoming rush of mail messages can cause a system blockage even though the subscribers are not generally heavy-use subscribers.

For example, a particular group of employees in an office facility assigned to the same processing unit may receive voice mail messages during the night from foreign business contacts. If these subscribers all attempted to retrieve their voice mail messages when they arrive at work at 8:00 AM, a system blockage will result even though these employees may not retrieve messages again during the rest of the day. Statistical engine 340 avoids such a situation by reassigning at least some of the subscribers to different home processing units.

In situations where it is not practical to move subscribers to different processors permanently, then such move can be made for a period of time only, based on a statistical probability of use during that time. Also, as shown in box 508, sometimes it is desirable to "move" a subscriber for storage of message purposes while leaving the previously stored messages on a "home" processor. This typically would be the situation when it is statistically determined that that subscriber almost never asks for messages until a certain time, say 8:00 AM, but a large number of messages are stored during the night for that use. In such a situation, the message storage can be made on a number of processors and the messages moved to a "home" processor during system low activity periods prior to 8:00 AM.

Although the present invention and its advantages have been described in detail, it should be understood that various changes, substitutions and alterations can be made herein without departing from the spirit and scope of the invention as defined by the appended claims.

What is claimed is:

1. A messaging system for storing and/or retrieving messages for a plurality of users, said system comprising:

a plurality of memories, each of said memories having a finite capacity; message processor coupled to a communication input for receiving, storing and retrieving a selected message from one of said memories, wherein each selected message is identified as belonging to selected ones of said plurality of users; and stored in one of said memories assigned to said users;

means for detecting an initiation and a termination of each access to said message processor, measuring a duration of each said access, and recording a time of day for each said access, thereby generating a statistical usage summary for each user and for each of said memories; and means for reassigning a first user from a first memory to a second memory in accordance with said statistical summary.

2. The system as set forth in claim 1 wherein said statistical summary includes an average number of accesses to said first memory during a first selected time period and an average number of accesses to said second memory during said first selected time period.

3. The system as set forth in claim 1 wherein said generated statistical summary includes a first peak access demand of said first memory and a second peak access demand of said memory.

4. The system as set forth in claim 1 wherein said reassigning includes reassigning a second user to a memory other than the memory to which said second user was previously assigned.

5. The system as set forth in claim 4 wherein said first user and said second user are selected based upon a statistical profile of the use made of said first memory by said first and second users or on behalf of said first and second users.

6. A system for assigning users to resources in accordance with the usage rate of said users with respect to said resources, said system comprising:

a plurality of communications ports;

a plurality of resources, each of said resources capable of access from any of said ports for the handling of data pertaining to an assigned user of said resources;

a statistical database for storing statistical data pertaining to the accesses to each system resource on a user by user basis; wherein said database includes data pertaining to whether each access to each system resource was due to a user directed access or due to a third party directed access, and wherein said third party directed access is for the purpose of storing data in said resource for delivery to the user assigned to said resource, and wherein said user directed access is for the purpose of retrieving said data stored in said resource; and means for rearranging users from one resource to another under control of said statistical data.

7. The system as set forth in claim 6 wherein said rearranging means includes means for temporarily reassigning the resource assigned to a particular user for third party initiated uses to a resource different from the resource assigned to said particular user for said user inhibited uses.

8. A mail system for receiving and/or retrieving mail messages for a plurality of subscribers to said mail system, said mail system comprising:

switching means for coupling to a plurality of telephone lines;

a plurality of message processors coupled to said switching means for receiving, storing and retrieving said mail messages, wherein each message processor of said plurality of message processors processes said mail messages for selected ones of said plurality of subscribers assigned to said each message processor;

routing means coupled to said switching means for routing said mail messages to said plurality of message processors; and a statistical engine coupled to said routing means, said statistical engine comprising:

monitoring circuitry for detecting an initiation and a termination of each access to said mail system, measuring a duration of each said access, and counting a total number of accesses to said mail system;

processor means coupled to said monitoring circuitry for 1) calculating a plurality of statistics for each of said message processors, and 2) comparing a first selected statistic of a first message processor with a maximum access capacity of said first message processor to determine a probability that simultaneous accesses to said first message processor will exceed said maximum access capacity; and control means for reassigning a first subscriber from said first message processor to a second message processor in order to minimize said probability.

9. The mail system as set forth in claim 8 wherein said first selected statistic comprises an average number of accesses to said first message processor during a first selected time period.

10. The mail system as set forth in claim 8 wherein said first selected statistic comprises a first peak access demand of said first message processor.

11. The mail system as set forth in claim 10 wherein said first peak access demand is associated with a first selected time of day.

12. The mail system as set forth in claim 8 further including a communications link coupled to each of said plurality of message processors and said routing means.

13. The mail system as set forth in claims 8 wherein said control means of said statistical engine causes said routing means to route mail messages for said first subscriber from said first message processor to said second message processor.

14. The mail system as set forth in claim 13 wherein said control means of said statistical engine causes said first message processor to transfer to said second message processor at least one mail message stored by said first message processor.

15. A method of distributing subscribers in a message storage system, wherein each subscriber is assigned to a selected one of a plurality of message processors operable of handling messages for said each subscriber, the method comprising the steps of:

detecting an initiation and a termination of each access of a plurality of accesses to the messaging system;

calculating from said detected initiations and terminations a plurality of statistics for each message processor in the plurality of message processors;

comparing a first selected statistic of a first message processor with a corresponding second selected statistic of a second message processor; and reassigning a first subscriber from the first message processor to the second message processor under direction of data obtained from said comparing step.

16. The method as set forth in claim 15 wherein the first selected statistic comprises an average number of accesses to the first message processor during a first selected time period and the second selected statistic comprises an average number of accesses to the second message processor during the first selected time period.

17. The method as set forth in claim 15 wherein the first selected statistic comprises a first peak access demand of the first message processor and the second selected statistic comprises a second peak access demand of the second message processor.

18. The method as set forth in claim 17 wherein the first peak access demand and the second peak access demand are associated with a first selected time of day.

19. A method of distributing subscribers in a message recording system, wherein each subscriber is assigned to a selected one of a plurality of message processors operable to handle messages for said each subscriber, the method comprising the steps of:

detecting an initiation and a termination of each access of a plurality of accesses to the message system;

measuring a duration of said each access;

counting a total number of accesses to the message system;

calculating a plurality of statistics for each message processor in the plurality of message processors;

comparing a first selected statistic of a first message processor with a maximum access capacity of the first message processor in order to determine a probability that simultaneous accesses to the first message processor will exceed the maximum access capacity; and reassigning a first subscriber from the first message processor to a second message processor in order to minimize the probability of exceeding the maximum access capacity of each of the processors.

20. The method as set forth in claim 19 wherein the first selected statistic comprises an average number of accesses to the first message processor during a first selected time period.

21. The method as set forth in claim 19 wherein the first selected statistic comprises a first peak access demand of the first message processor.

22. The method as set forth in claim 21 wherein the first peak access demand is associated with a first selected time of day.

* * * * *